UNITED STATES PATENT OFFICE.

CHARLES E. BAKER, OF CHICAGO, ILLINOIS.

METHOD OF TREATING ORES.

972,149.  Specification of Letters Patent.  Patented Oct. 11, 1910.

No Drawing.  Application filed May 19, 1910.  Serial No. 562,331.

*To all whom it may concern:*

Be it known that I, CHARLES E. BAKER, a citizen of the United States, residing at Chicago, in the county of Cook and State of Illinois, have invented certain new and useful Improvements in Methods of Treating Ores, of which the following is a specification.

This invention relates to a method of treating mixed ores for converting the metallic values thereof into chlorids. According to the invention such ores are subjected to the action of a plurality of reagents including gaseous hydrochloric acid or equivalent halogen-acid gas, and free chlorin.

It is found in practice that ores or metallurgical products wherein the metallic values exist in combination both with sulfur and oxygen, as for example partially or incompletely roasted sulfids, mattes, native ores, or mixtures of these, are not readily chloridized by treatment either with gaseous hydrochloric acid or gaseous chlorin separately applied. I have found, however, that a mixture of these reagents, properly proportioned, is highly effective for the treatment of such mixed ores.

While my invention is not restricted to any particular mixture containing the halogen-acid gas and chlorin, it is deemed preferable that the halogen-acid should be supplied in sufficient quantity to chloridize the oxid or oxidized constituents of the ore, including any carbonate which may be present, and the chlorin in proportion to chloridize the sulfid constituents. Preferably also, oxygen or air is introduced to oxidize the sulfur and other metalloids, whereby loss of chlorin by combination therewith is avoided.

The method is applicable broadly to the treatment of appropriate ores containing zinc, copper and other metals. As applied for example to the treatment of ores of a divalent metal such as zinc, a typical reaction in accordance with my invention may be expressed as follows:

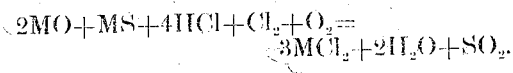

In general, the higher the proportion of oxid or oxidized constituents of the ore the higher should be the proportion of halogen-acid gas with respect to the free chlorin in the mixture. As regards the conditions of operation it is merely necessary that the gaseous reagent be applied to the properly crushed ore in a revolving drum or other suitable vessel which may be maintained at the proper reacting temperature. Moderate temperatures only are required, and excessive heating which might result in the formation of sulfates should be carefully avoided.

The source or mode of preparation of the mixed gases is not material. I prefer however to apply the chlorin accompanied by or in the presence of sufficient moisture to determine the production of an adequate proportion of hydrochloric acid, as expressed for example by the reaction:

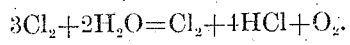

Or I may subject the ores to the gaseous products obtained by reacting upon sulfur chlorid with water, supplying therewith the required excess of free chlorin.

The process as described above proceeds regularly and results in an efficient chlorination of ores of the character described. At the moderate temperatures employed, such agglomeration or balling of the ore as results when heat is applied to drive off sulfur chlorid in dry chlorination is avoided.

I claim:

1. The method of treating mixed sulfid and oxid ores, which consists in reacting thereon with a gaseous mixture containing hydrochloric acid and free chlorin.

2. The method of treating mixed sulfid and oxid ores, which consists in reacting thereon with a gaseous mixture containing hydrochloric acid, free chlorin and oxygen.

3. The method of treating mixed sulfid and oxid ores, which consists in reacting thereon with a gaseous mixture containing hydrochloric acid and free chlorin, the chlorin in proportion to chloridize the sulfid constituents of the ore.

4. The method of treating mixed sulfid and oxid ores, which consists in reacting thereon with a gaseous mixture containing hydrochloric acid, free chlorin and oxygen, the chlorin in proportion to chloridize the sulfid constituents of the ore.

5. The method of treating mixed sulfid and oxid ores, which consists in reacting thereon with an excess of chlorin in presence of moisture, under such conditions that a portion of the chlorin is converted into hydrochloric acid.

In testimony whereof, I affix my signature in presence of two witnesses.

CHARLES E. BAKER.

Witnesses:
E. O. SAULE,
HENRY WHITE.